(12) United States Patent
Alexander et al.

(10) Patent No.: US 7,665,171 B2
(45) Date of Patent: Feb. 23, 2010

(54) WATER-OPERATED WASH BRUSH WITH REMOVABLE BRUSH HEAD

(75) Inventors: Gus Alexander, Iverness, IL (US); Morgan McCarthy, Hoffman Estates, IL (US)

(73) Assignee: FNA IP Holdings, Inc., Elk Grove Village, IL (US)

( * ) Notice: Subject to any disclaimer, the term of this patent is extended or adjusted under 35 U.S.C. 154(b) by 0 days.

(21) Appl. No.: 11/973,257

(22) Filed: Oct. 5, 2007

(65) Prior Publication Data

US 2008/0083077 A1    Apr. 10, 2008

Related U.S. Application Data

(60) Provisional application No. 60/850,150, filed on Oct. 6, 2006.

(51) Int. Cl.
*A46B 13/04* (2006.01)
*A46B 13/06* (2006.01)

(52) U.S. Cl. .......................... 15/29; 403/202; 403/249; 403/252; 403/253; 403/357

(58) Field of Classification Search .................... 15/24, 15/29, 23, 28, 52, 87; 403/202, 261, 249, 403/252, 253, 326, 329, 357
See application file for complete search history.

(56) References Cited

U.S. PATENT DOCUMENTS

| | | | | |
|---|---|---|---|---|
| 995,055 | A * | 6/1911 | Carr | 403/329 |
| 3,401,416 | A * | 9/1968 | Ziegler | 15/49.1 |
| 3,436,107 | A * | 4/1969 | Karden | 403/315 |
| 3,906,574 | A * | 9/1975 | Kaeser | 15/29 |
| 4,796,321 | A * | 1/1989 | Lee | 15/29 |
| 5,692,260 | A | 12/1997 | Haiduk | |
| 5,909,754 | A * | 6/1999 | Oh | 15/29 |
| 6,915,541 | B2 | 7/2005 | Alexander | |

* cited by examiner

*Primary Examiner*—Gary K Graham
(74) *Attorney, Agent, or Firm*—Cook Alex Ltd.

(57) ABSTRACT

A fluid operated wash brush is provided. The wash brush includes a casing having a downwardly opening top cover. The casing includes a liquid inlet for connection to a fluid supply. The wash brush also includes a rotary wash brush and a mounting shaft supported by the casing for relative rotation on which the rotary wash brush is carried. A retention mechanism is carried on a distal end of the mounting shaft for releasable engagement and disengagement with the rotary wash brush.

14 Claims, 3 Drawing Sheets

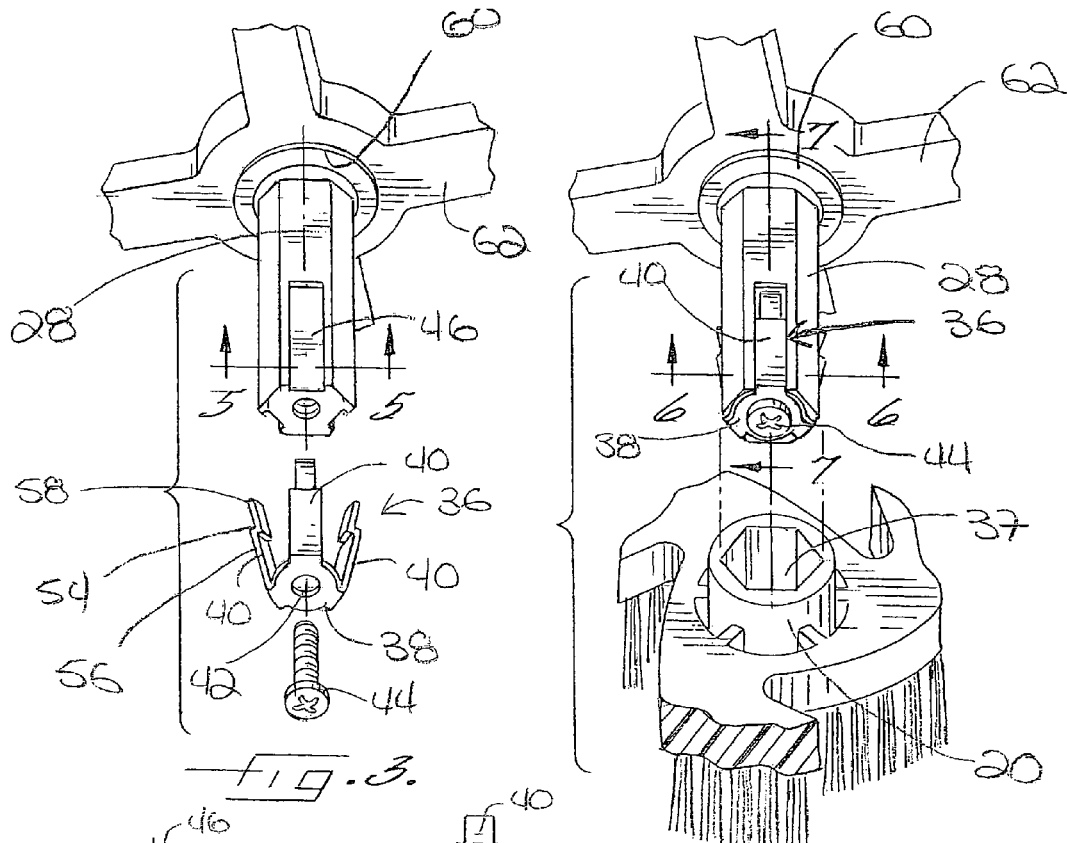
_fig.3._
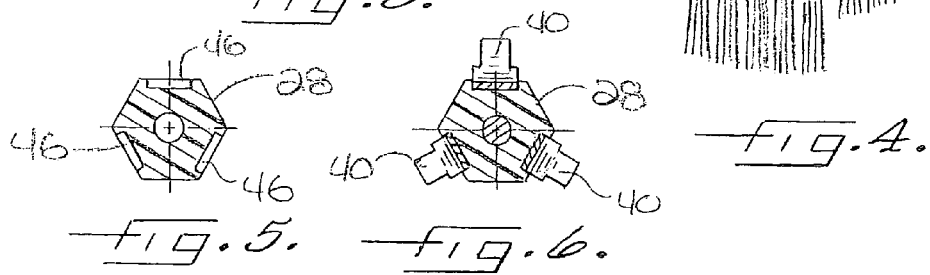
_fig.4._
_fig.5._  _fig.6._
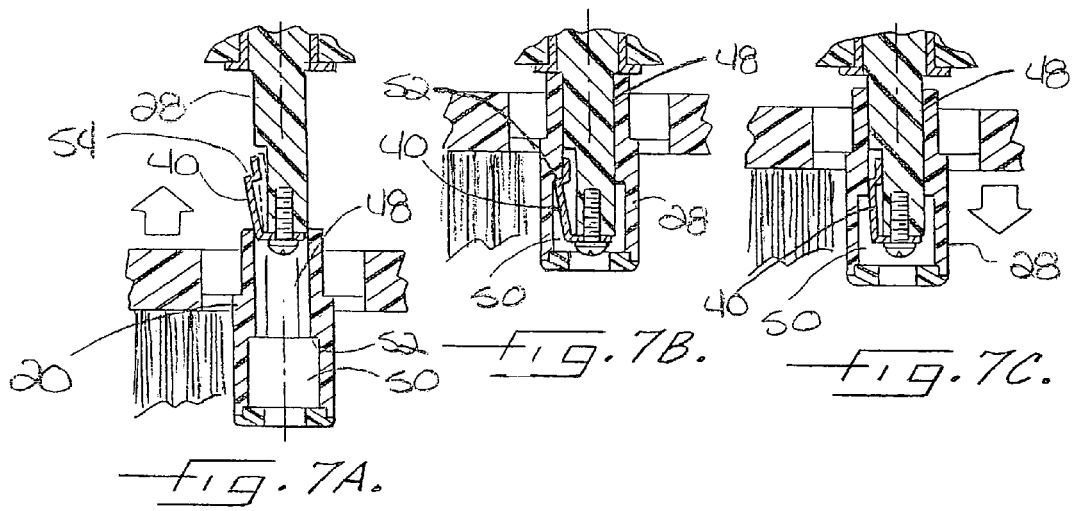
_fig.7A._  _fig.7B._  _fig.7C._

WATER-OPERATED WASH BRUSH WITH REMOVABLE BRUSH HEAD

FIELD OF THE INVENTION

The present invention relates generally to wash brushes, and more particularly, to wash brushes which are rotatably operated by the water or other washing fluid directed into and through the brush.

BACKGROUND OF THE INVENTION

Water-operated wash brushes are known for use in many cleaning applications, such as cleaning floors, walls, mechanical work pieces, and vehicles. Such wash brushes commonly include an upper casing into which a nozzle forcefully directs a tangential jet of water that rotatably drives a turbine-like impellor, which in turn through appropriate reducing gears, drives a wash brush supported in depending relation to the casing at a rotary speed less than the turbine. The wash brush is constantly wetted by the water that produces the brush rotation.

Such wash brushes have particularly utility in the consumer market since they are easy to operate and can be used for many household cleaning tasks. Since they are designed for economical manufacture, however, wash brushes for the consumer market often do not have the versatility desired for use in diverse cleaning applications. For example, in some cleaning applications such as washing cars, it is desirable to have a brush with relatively soft cleaning bristles. In other applications, such as floor cleaning, a brush with more abrasive bristles is preferred. Unfortunately, however, the brushes on consumer market wash brushes are either so cumbersome to change that many consumers will not even attempt it for simple household cleaning tasks or they cannot be changed at all.

OBJECTS AND SUMMARY OF THE INVENTION

It is an object of the present invention to provide a water operated wash brush that can be operated with interchangeable bristle-type brush heads of different softness and abrasiveness.

Another object is to provide a water-operated wash brush as characterized above, in which the brush head may be easily removed and replaceable with a brush head having different cleaning bristles without necessitating cumbersome removal and replacement of brush head fasteners.

A further object is to provide a water-operated wash brush that can be simultaneously-operated with brush heads having bristles of different degrees of bristle flexibility and softness with each brush head being interchangeable with other brush heads without the need for removal of any brush head fasteners or the like.

BRIEF DESCRIPTION OF THE SEVERAL VIEWS OF THE DRAWING(S)

FIG. 3 is a partially exploded perspective view of the rotating shaft and brush head retention mechanism of the wash brush of FIG. 1.

FIG. 4 is a partially exploded perspective view of the brush head retention mechanism on the rotating shaft and the hub of the brush head of the wash brush of FIG. 1.

FIG. 5 is a cross-sectional view taken in the plane of line 5-5 in FIG. 3 of the rotating shaft of the wash brush of FIG. 1.

FIG. 6 is a cross-sectional view taken in the plane of line 6-6 in FIG. 4 of the rotating shaft and the brush head retention mechanism of the wash brush of FIG. 1.

FIG. 7A is a partial side sectional view showing the initial engagement of the hub on the wash brush with the rotating shaft as the brush head is installed on the wash brush of FIG. 1.

FIG. 7B is a partial side sectional view showing the hub on the brush head fully installed on the rotating shaft of the wash brush of FIG. 1 and with the retention mechanism engaged with the hub.

FIG. 7C is a partial side sectional view showing the hub on the brush head being removed from the rotating shaft of the wash brush of FIG. 1.

DETAILED DESCRIPTION OF THE INVENTION

Figure 1:
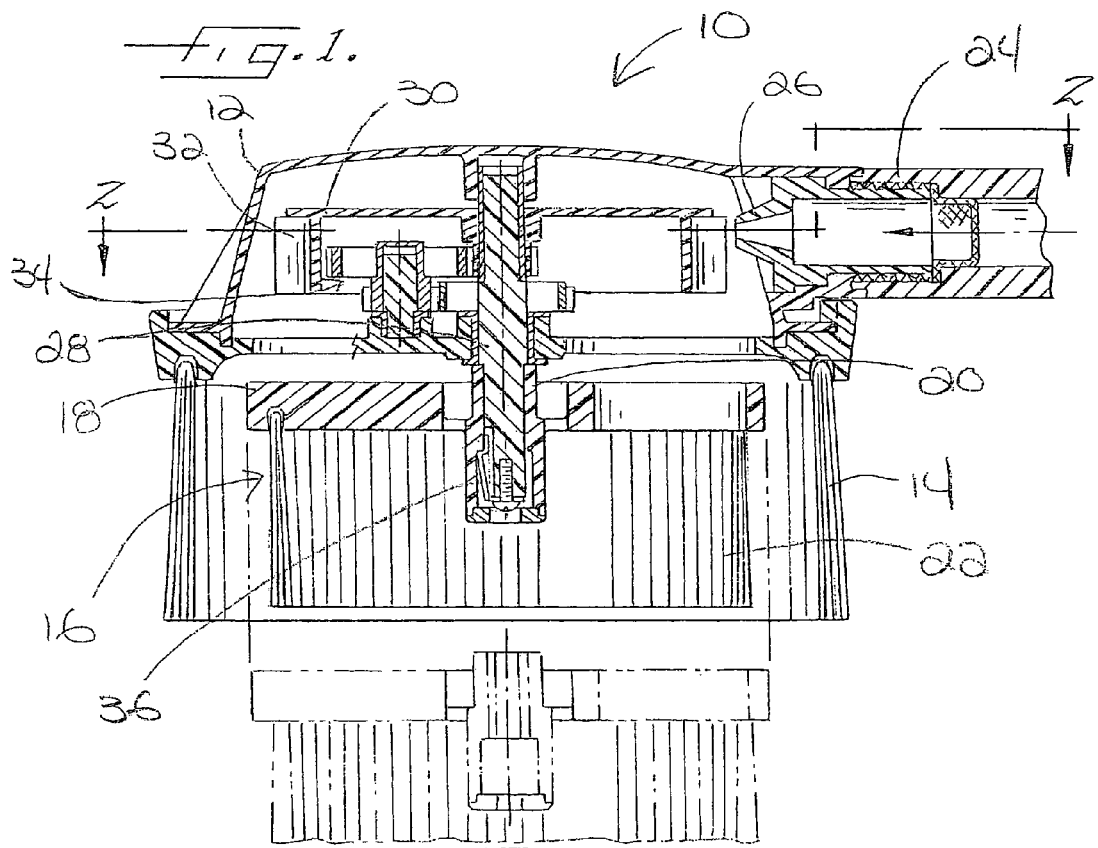
FIG. 1 is a side sectional view of an exemplary wash brush with a removable brush head in accordance with the present invention.

Referring now more particularly to FIG. 1 of the drawings, there is shown an illustrative water-operated wash brush 10 in accordance with the invention. The wash brush 10 includes a downwardly facing, cup-shaped casing 12 having an outer annular brush 14 fixed in depending relation thereto and a rotary brush head 16. In this case, the rotary brush head 16 is supported in concentric relation within the outer fixed brush 14 for relative rotation thereto resulting from the supply of washing fluid to the wash brush. The rotary brush head 16 includes an upper base 18 with a central hub 20 and which carries an annular array of downwardly directed bristles 22. A hollow support and liquid supply rod 24 is connected in outwardly extending relation to the casing 12 for coupling to a supply of water or other cleaning fluid in a known manner. A nozzle 26 is secured in the downstream end of the rod 24 for forcefully directing a tangential liquid flow stream into an internal chamber defined by the casing 12.

For rotating the rotary brush head 16, the wash brush 10 includes a central mounting shaft 28 that is rotatably supported in the casing 12 and turns as a result of the discharge of pressurized fluid into the casing through the tangential nozzle 26. To this end, an impeller 30 is supported on the mounting shaft 28 such that the impeller can rotate relative to the shaft. The impeller 30 has a plurality of equally spaced blades 32 (best shown in FIG. 2) which are driven by discharging liquid into the casing 12 thereby causing rotation of the impeller. Rotation of the impeller 30 is, in turn, transmitted to the mounting shaft 28 through a reducing gear train 34 (see FIGS. 1 and 2). Additional details regarding the structure and operation of the wash brush 10 including the rotary brush drive system are disclosed in commonly assigned U.S. Pat. No. 6,915,541, the disclosure of which is incorporated herein by reference.

In accordance with the invention, the brush head 16 is easily removable from the wash brush 10 and replaceable with different types of brush heads 16 that are more suitable for particular cleaning applications without requiring disassembly of any fastening elements or the use of any auxiliary tools. For example, for a given cleaning application, the brush head 16 installed on the wash brush 10 could be replaced with a brush head 16 having higher quality, softer or more abrasive bristles that may be more compatible with the cleaning application. To this end, the brush head 16 and mounting shaft 28 of the wash brush 10 are adapted for easy, quick-action engagement and disengagement via a retention mechanism carried on the mounting shaft.

The retention mechanism, in this instance, comprises a spring latching mechanism 36 that is arranged on the distal end of the mounting shaft 28 and is releasably engageable in a central opening 37 in the hub 20 of the brush head 16 as shown in FIGS. 3 and 4. The illustrated spring latching mechanism 36 comprises a head 38 that is securable to the end of the mounting shaft 28 and a plurality of resilient prongs 40 that extend away from the head 38. To facilitate connection of the head 38 to the shaft 28, the head 38 includes a central opening 42 for receiving and retaining a screw 44 that, in turn, engages with the end of the mounting shaft 28 (see FIG. 3). In the illustrated embodiment, the mounting shaft 28 end and the opening 37 in the hub 20 have complementary hex-shaped cross-sectional configurations that ensure that the rotary motion of the mounting shaft 28 is transmitted to the brush head 16.

In this case, the spring latching mechanism 36 includes 3 spring prongs 40 that are equally spaced about the perimeter of the head 38. When the spring latching mechanism 36 is mounted on the shaft 28, each of the spring prongs 40 is aligned with a corresponding groove 46 in the mounting shaft 28. As best shown in FIGS. 3 and 5, each groove 46 is arranged in a respective one of the flat sides of the shaft 28 and extends in the axial direction of the shaft away from its distal end. These grooves 46 allow the spring prongs 40 to flex inward when the brush head 16 is slid onto the mounting shaft 28. In particular, the central opening 37 in the hub 20 includes an upper reduced diameter neck portion 48 and a lower relatively larger diameter chamber 50. The neck portion 48 of the hub 20 has a cross-sectional size and configuration that is substantially the same as the cross-sectional size and configuration of the end of the mounting shaft 28. As a result, when the end of the shaft 28 is slid through the neck portion 48, the inside walls of the neck portion 48 engage the spring prongs 40 and force them inward as shown in FIG. 7A. To facilitate this camming action between the inside walls of the neck 48 and the prongs 40, the prongs 40 angle outward and away from the shaft as they extend away from the distal end of the shaft (see, e.g. FIGS. 3, 6 and 7A).

To permit the spring latching mechanism 36 to releasably engage the brush head 16, the grooves 46 in the shaft 28 are deep enough that the prongs 40 can flex sufficiently inward to allow the spring latching mechanism 36 can pass through the neck portion 48 into the relatively larger lower chamber 50. Once in the larger lower chamber 50, the prongs 40 spring back outward and into engagement with a lip 52 at the transition between the upper neck portion 48 and the lower chamber 50 as shown in FIG. 7B. To facilitate engagement with the lip 52, each prong includes a catch 54 adjacent its distal end. In this case, the catch 54 comprises a short elbow that extends perpendicularly away from the elongate first leg 56 of the prong and a second relatively shorter leg 58 of the prong that extends perpendicularly away the elbow (best shown in FIG. 3). This catch 54 engages the lip 52 when the end of the mounting shaft 28 is fully inserted in the opening 37 in the hub 20 and prevents the brush head 16 from being pulled off of the shaft during normal operation of the wash brush (see FIG. 7B). As further shown in FIG. 7B, further upward movement of the brush head 16 on the shaft 28 is prevented by engagement of the rim around the upper edge of the hub opening 37 with a collar 60 surrounding the shaft 28 and supported relative to the casing via a plurality of radial spokes 62 (best shown in FIGS. 3 and 4).

To permit easy removal of the brush head 16 from the shaft 28, the catches 54 on the prongs of the spring latch mechanism 36 are designed so as to slip out of engagement with the lip 52 in the opening 37 in the hub 20 upon the application of a predetermined level of pulling force on the brush head 16 as shown in FIG. 7C. As will be appreciated, the predetermined force necessary to pull off the brush head 16 should be large enough to ensure that the brush head 16 remains secured to the shaft 28 during normal operation of the wash brush 10, but small enough that an operator of the wash brush could readily pull off the brush head 16 manually.

Figure 2:
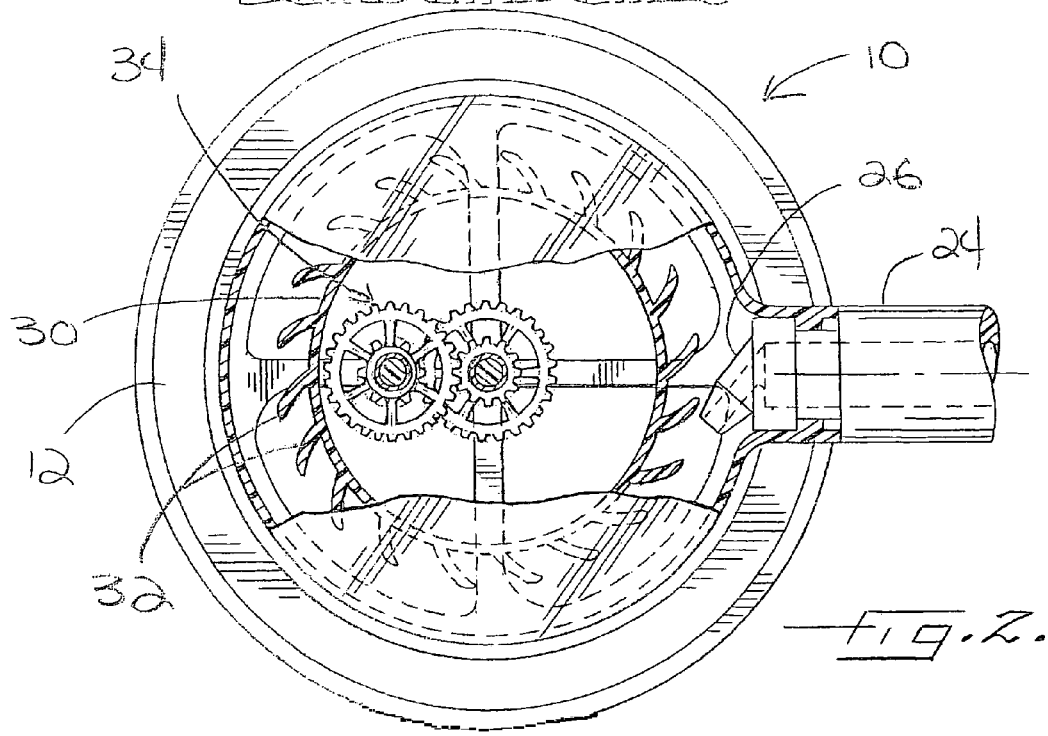
FIG. 2 is a cross-sectional view of the wash brush of FIG. 1 taken in the plane of line 2-2 in FIG. 1.
Figure 8:
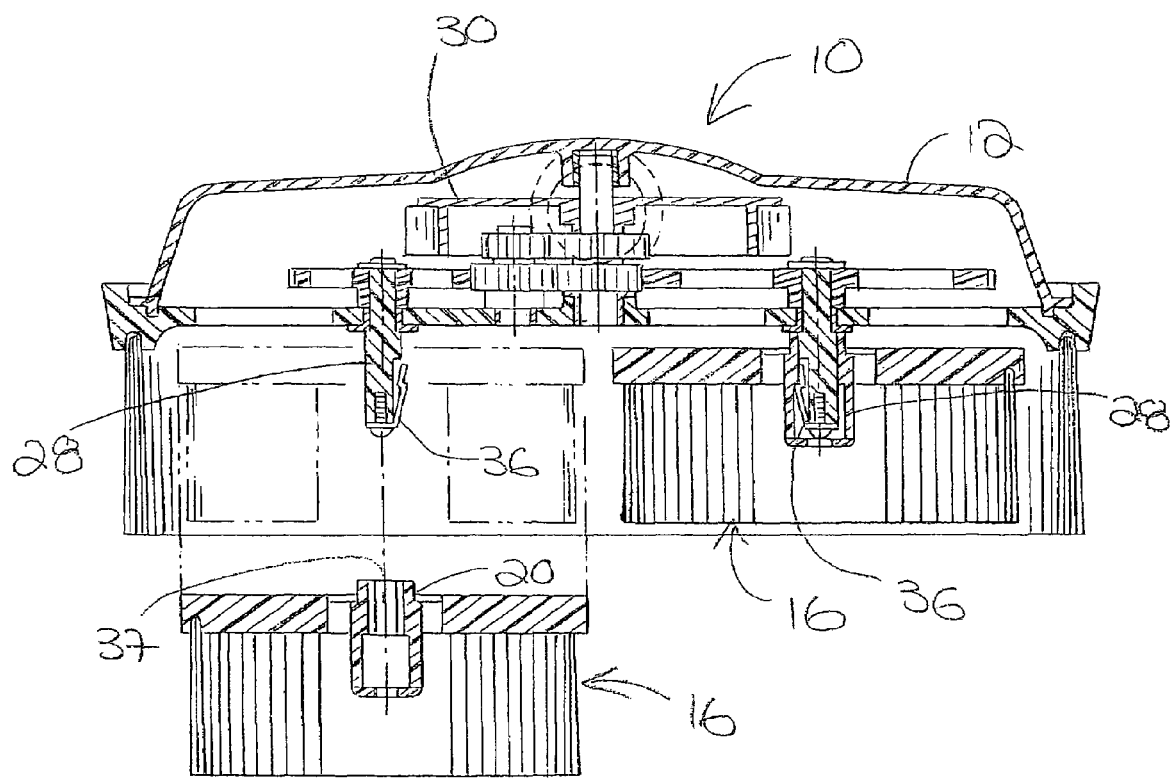
FIG. 8 is a side sectional view of an alternative embodiment of a wash brush according to the invention which has two brush heads.

Referring now to FIG. 8, there is shown an alternative embodiment of a water-operated wash brush 10 in accordance with the invention, which includes a plurality of brush heads 16 each of which can be easily removed and replaced with different brush heads 16 for particular cleaning operations. The same reference numbers used for elements of the first embodiment of FIGS. 1 and 2 are used for the corresponding elements of the FIG. 8 embodiment. Similar to the embodiment shown in FIGS. 1 and 2, the wash brush 10 of FIG. 8 includes an impeller 30 that is driven by water discharged in the casing of the wash brush 10. The impeller 30, in turn, drives, in this case, two rotary mounting shafts 28 through a gear train 34. Each mounting shaft 28 has a spring latching mechanism 36 like that shown in FIGS. 3-4 attached to its distal end that releasably engages with the central opening 37 in the hub 20 of the brush head 16 in the same manner described above. Providing a plurality of removable and replaceable brush heads 16 on the wash brush 10 provides further versatility in that the multiple heads can provide a larger cleaning zone as well as allow the types of brush heads used to be specifically tailored for a given cleaning application. If desired for a particular cleaning application, the use of multiple removable brush heads 16 even allows several different types of brush heads to be used at the same time, such as one brush head with stiff, coarse bristles and one brush head with soft, fine bristles.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A fluid operated wash brush comprising:
   a casing having a top cover with a downward facing opening, the casing including a liquid inlet for connection to a wash liquid supply;
   a rotary wash brush;
   a mounting shaft supported by the casing for relative rotation, the rotary wash brush being carried by the mounting shaft adjacent the downward facing opening in the top cover;
   an impeller configured to turn in response to wash liquid discharging into the casing through the fluid inlet, the impeller being operably coupled to the mounting shaft by a reducing gear train, the wash liquid exiting the casing through the downward facing opening in the top cover; and
   a separate spring latching mechanism connected to an exposed distal end of the mounting shaft for releasable engagement and disengagement with the rotary wash brush, the spring latching mechanism comprising a plurality of prongs that extend inward away from a distal end of the shaft along a surface of the shaft with each prong being aligned with a separate corresponding groove in the shaft.

2. The wash brush of claim 1 wherein the spring latching mechanism is receivable in an opening in a hub of the rotary wash brush.

3. The wash brush of claim 1 wherein the opening in the hub includes an upper neck portion with a relatively smaller cross-sectional area and a lower chamber with a relatively larger cross-sectional area such that as the rotary brush is placed on the rotary shaft the upper neck portion cams the prongs of the spring latching mechanism inward into the groove with the prongs springing outward when they reach the lower chamber.

4. The wash brush of claim 3 wherein the prongs angle outward and away from the mounting shaft as they extend away from the distal end of the shaft.

5. The wash brush of claim 3 wherein a lip is arranged between the upper neck portion and the lower chamber and the prongs engage the lip when the rotary brush is fully installed on the mounting shaft.

6. The wash brush of claim 5 wherein each prong includes a catch that engages the lip when the rotary brush is fully installed on the mounting shaft.

7. The wash brush of claim 6 wherein the catches are configured to disengage from the lip upon the application of a predetermined force on the rotary brush in a direction axially away from the mounting shaft.

8. The wash brush of claim 1 wherein the rotary brush is one of a plurality of rotary brushes and the mounting shaft is one of a plurality of mounting shafts with each mounting shaft having a respective retention mechanism on the distal end thereof.

9. A fluid operated wash brush comprising:
   a casing having a top cover with a downwardly facing opening, the casing including a liquid inlet for connection to a wash liquid supply;
   a rotary wash brush;
   a mounting shaft supported by the casing for relative rotation, the rotary wash brush being carried by the mounting shaft adjacent the downward facing opening in the top cover;
   an impeller operably coupled to the mounting shaft and being configured to turn in response to wash liquid discharging into the casing, the wash liquid exiting the casing through the downward facing opening in the top cover; and
   a separate spring latching mechanism connected to an exposed distal end of the mounting shaft for releasable engagement and disengagement with the rotary wash brush, the spring latching mechanism comprising a head secured to the distal end of the mounting shaft and a plurality of prongs that extend inward away from the head along a surface of the shaft with each prong being aligned with a separate corresponding groove in the shaft, the spring latching mechanism being receivable in an opening in a hub of the rotary wash brush, the opening in the hub including an upper neck portion with a relatively smaller cross-sectional area and a lower chamber with a relatively larger cross-sectional area such that as the rotary brush is placed on the rotary shaft the upper neck portion cams the prongs of the spring latching mechanism inward with the prongs springing outward when they reach the lower chamber.

10. The wash brush of claim 9 wherein the prongs angle outward and away from the mounting shaft as they extend away from the distal end of the shaft.

11. The wash brush of claim 9 wherein a lip is arranged between the upper neck portion and the lower chamber and the prongs engage the lip when the rotary brush is fully installed on the mounting shaft.

12. The wash brush of claim 11 wherein each prong includes a catch that engages the lip when the rotary brush is fully installed on the mounting shaft.

13. The wash brush of claim 12 wherein the catches are configured to disengage from the lip upon the application of a predetermined force on the rotary brush in a direction axially away from the mounting shaft.

14. The wash brush of claim 9 wherein the rotary brush is one of a plurality of rotary brushes and the mounting shaft is one of a plurality of mounting shafts with each mounting shaft having a respective retention mechanism on the distal end thereof.

* * * * *